Sept. 5, 1967            H. RUCHLIS            3,339,291
EDUCATIONAL BALANCE DEVICE
Filed Oct. 15, 1965
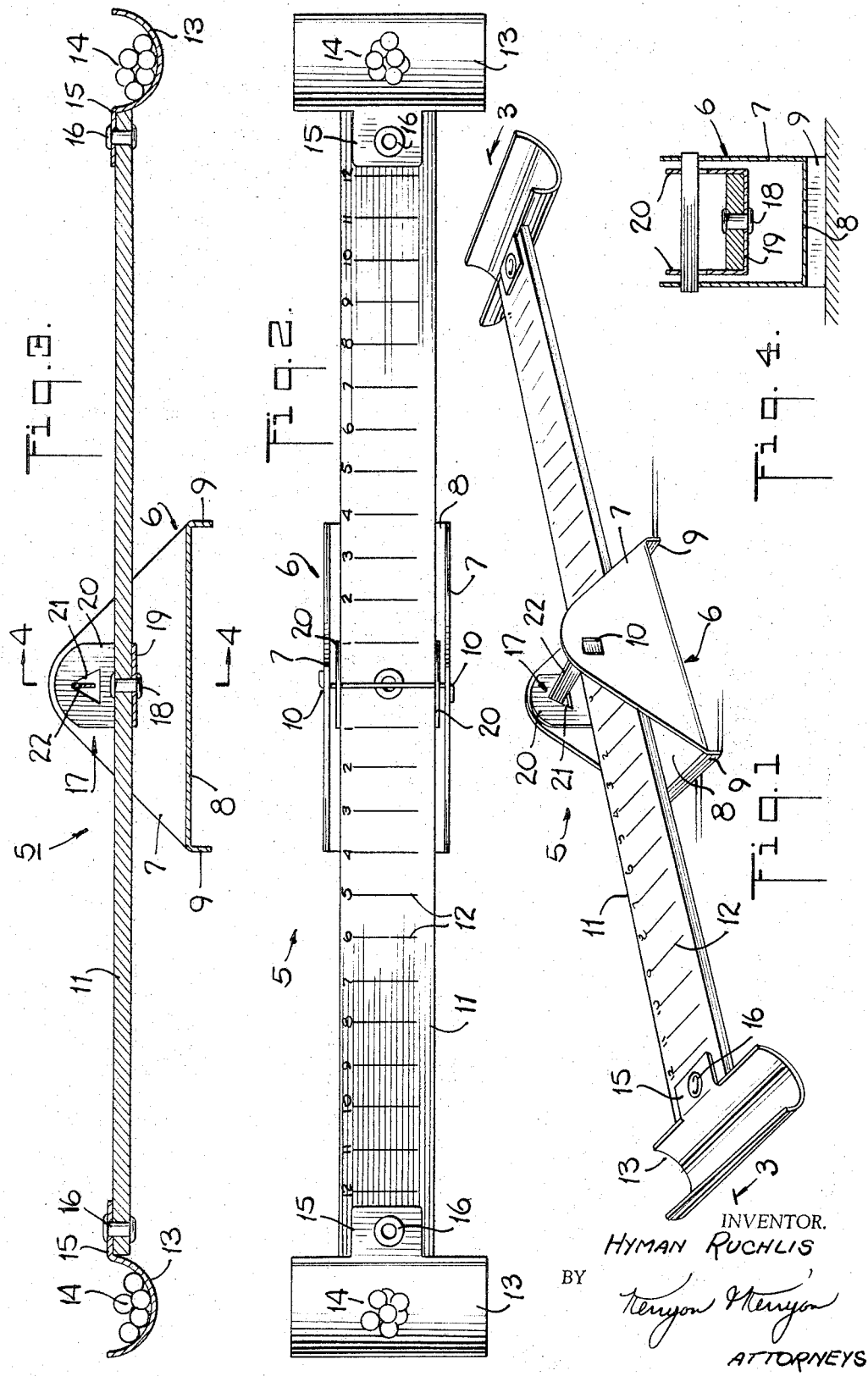
INVENTOR.
HYMAN RUCHLIS
BY
ATTORNEYS

3,339,291
EDUCATIONAL BALANCE DEVICE
Hyman Ruchlis, Brooklyn, N.Y., assignor to Harcourt, Brace & World, Inc., New York, N.Y., a corporation of New York
Filed Oct. 15, 1965, Ser. No. 496,483
5 Claims. (Cl. 35—19)

This invention relates to an educational balance device. More particularly, this invention relates to an educational balance device for demonstrating the principle of the equal arm balance.

In the field of applied science projects of science education it is desirable to provide teaching devices and visual aids which are particularly adapted for limited classroom space and designed for either wall hanging or table mounted lecture presentation. These devices and apparatus must be capable of stimulating a student's interest, intensifying the student's retention of the physical principle being verified in the demonstration and motivating the student by personal involvement. Among the problems of achieving these ends are the problem of producing a production model at low cost, as well as the problem of providing an easily understandable model.

The heretofore known equal arm balances which have been available for classroom use have been bulky and expensive. One of the basic reasons for the expensive nature of the balances is that they have been designed to ensure that the centers of gravity of the weights placed on each side of the balances are precisely equally distant from the fulcrum. Some of the balances have used a suspension system in which the weights are placed in swinging pans supported from an overhead bar or beam at a fixed point. Other balances have used a parallelogram linkage system.

Further, the balances heretofore used have to be handled with a degree of care so as to avoid any damage to the weighing accuracy and sensitivity of the balances.

Accordingly, it is an object of this invention to provide an educational balance device for demonstrating the principle of the equal arm balance.

It is another object of this invention to provide an equal arm balance device for educational purposes which is inexpensive to manufacture and simple to use.

It is another object of this invention to provide an equal arm balance for educational purposes which can be subjected to impact loads and careless use without affecting the use of the balance as a demonstration device.

It is another object of this invention to provide an equal arm balance for educational purposes which is stable.

It is another object of this invention to provide an equal arm balance for educational purposes which is compact and which can be easily stored.

It is another object of this invention to provide an equal arm balance which can be used to demonstrate the principle of the lever.

Generally, this invention provides an educational balance device for demonstrating the principle of operation of an equal arm balance device which is comprised of a support means of U-shaped cross-section, a fulcrum means supported in and positioned across the legs of the support means, a yoke means of U-shaped cross-section supported from the fulcrum means in depending manner, an elongated flat beam of substantial width supported at its central portion on the base of the yoke means, and a semi-cylindrical pan means secured to each end of the beam.

The balance device is easily assembled by initially securing the beam in place in the yoke means, sliding the beam and yoke means into the U-shaped support means between the sides of the support means, and sliding the fulcrum means through suitable corresponding slots in the yoke means and support means. The slots of the yoke means are formed in the upper portions of the legs of the yoke means with a triangular shape so that the apex of each slot will rest on the top edge of the fulcrum means and align the center of gravity of the beam with the fulcrum means.

Because the beam is mounted with its center of gravity below the fulcrum, the device possesses a greater degree of stability then those balance beams which are supported with their centers of gravity directly over their respective fulcrums. Further, because the beam is of a substantial width, it cannot be readily swayed by a horizontal force. Accordingly, the width of the beam adds to its stability.

The shape of the pan means which are affixed to each end of the beam add to the accuracy of the device by insuring that such objects as pens, pencils, clips, coins, and like objects, slide down the sloping sides and center themselves at the lowest points of the pan means. If small objects are added to the pan means, they will pile up in such a manner that their center of gravity is above the lowest point of the pan means. Consequently, for such objects the distances to the fulcrum of the weights in both pan means are substantially the same. The variations in readings are rarely more than a few tenths of a gram away from the true value. This modest degree of inaccuracy can be tolerated since the essential goals of compactness and low cost required by educational institutions below college level are obtained.

Additionally, the beam is marked off with a series of equally spaced gradation lines on either side of the fulcrum which enables the balance device to be utilized as a didactic tool to demonstrate and explain the principle of the lever.

The balance device is constructed of low cost materials which are arranged in a low, compact manner which aids in the prevention of toppling while being used in classroom situations. The simplicity of the balance device construction makes it possible to use strong components while keeping the weight low to provide for rugged use and to facilitate repair and replacement whenever necessary.

These and other objects and advantages of the invention will become more apparent from the following detailed description and appended claims taken in conjunction with the accompanying drawings in which:

FIG. 1 illustrates a perspective view of the educational balance device of the invention;
FIG. 2 illustrates a top view of the educational balance device of FIG. 1;
FIG. 3 illustrates a view taken at line 3—3 of FIG. 1; and
FIG. 4 illustrates a view taken at line 4—4 of FIG. 3.

Referring to the drawings, the educational balance device 5 has a support means 6 which is made of an inexpensive material, such as, sheet steel, which is strong and rugged. The support means 6 is formed with a pair of upstanding legs 7 forming a U-shaped cross-section with a flat base portion 8. The base portion 8 is further provided with a pair of depending legs 9 formed by turning over the ends of the base portion 8 which are adapted to rest the device 5 on a table or similar support surface. Each upstanding leg 7 of the support means 6 is formed with a vertical slot 10 near its upper end which is correspondingly opposite to the slot in the other leg 7. The support means 6 thus formed provides a stable base for the device which can be subjected to impact loads without damage to its usefulness as a support.

The beam 11 is made of any inexpensive strong material such as wood which can be provided with a series of gradations, or calibration marks 12, along its entire length. The beam 11 is flat and of a relatively substantial width which is capable of holding flat objects, such as, small weights, coins and clips and which is capable of resisting horizontal forces so as to provide a degree of stability to the device 5 along with its other characteristics.

The beam 11 is provided at each end with a semi-cylindrical pan means 13 which is adapted to hold the objects to be weighed for a demonstration. Because of the semi-cylindrical shape of the pan means 13, any small objects 14, such as, pens, pencils, etc., will slide down the sides and attempt to center themselves at the lowest point of the pan means. Further, whenever powders, granular material or liquids encased in suitable plastic bags or semi-cylindrical containers are weighed, the center of gravity of such materials will be aligned accurately with the centers of the pan means 13. Accordingly, although the method of weighing cannot be used for objects larger or wider than the pan means 13, the range of usefulness is adequate for most enducational purposes below the college level.

The pan means 13 are each secured to the beam 11 in any suitable manner, such as, by securing a tab portion 15 of each pan means to the beam 11 by a deformed grommet 16.

A yoke means 17 which is formed of a material similar to the support means 6 and with a U-shaped cross-section which allows it to fit within the U-shaped confines of the support means 6 is secured to the beam 11 at a central point which corresponds to the center of gravity of the beam 11 by a suitable pin or grommet 18. The U-shape of the yoke means 17 is formed by a flat base portion 19 and a pair of opposed legs 20. Each leg 20 is provided near its upper portion with a triangular slot 21 opposite to the corresponding slot 21 in the other leg 20. The pin or grommet 18 passes through the base portion 19 of the yoke means 17 and the beam 11.

As shown in FIG. 4, the legs 20 of the yoke means 17 are substantially less in height than the legs 7 of the support means 6. This allows the beam 11 to swing within the support means 6 to a satisfactory degree.

A fulcrum means 22 which is formed with a single strip and also of inexpensive, strong material positions the beam 11 and yoke means 17 within the support means 6. When the yoke means 17 is positioned between the legs 7 of the support means 6 so that the vertical slots 10 and triangular slots 21 are in alignment, the fulcrum means 22 is slipped through the respective slots 10, 21 and each end of the strip is turned 90 degrees to the axis of the strip in order to maintain the strip in place. The apex of each triangular slot 21 will rest on the top edge of the fulcrum means 22 so that a conventional "knife-edge" pivot support is formed.

The triangular slots 21 are positioned in the yoke means 17 in a manner in which the apices of the slots 21 are in alignment with a plane passing through the center of gravity of the beam 11 so that the beam 11 is actually supported at its center of gravity with the pan means 12, each being equi-distant from the fulcrum means 22. Further, because the triangular slots 21 and fulcrum means 22 are disposed above the beam 11 so as to form a suspension type pivot support, and because there are two contact points between the fulcrum means and yoke means the stability of the device 5 is enhanced.

The gradation, or calibration, marks 12 allow the beam 11 to be utilized to demonstrate the principle of the lever by positioning weights in the conventional manner at various points along the beam 11 represented by the marks 12. Further, the data obtained in such a demonstration can also be used to provide an additional method of weighing objects or obtaining multiples or subdivisions of weights in any desired ratio.

The device 16 is easily assembled or disassembled and because of such can be stored in a small, compact space either in groups or singly. Further, the components, if damaged or misplaced, can easily be repaired or replaced with a minimum of time and effort.

Because of the width of the beam and the suspension-type pivot support allowing the center of gravity of the beam to be below the fulcrum, the device possesses a high degree of stability as the beam swings in a vertical plane which is necessary in classroom use.

It has been found that a balance device made in accordance with the invention has the following dimensions: the beam has a length of 20 inches and a width of 1½ inches; the yoke means has a height at its top most point of 1¼ inches; the support means has a height at its top most point of 2½ inches, a clear space between upstanding legs of 1¾ inches, an overall length of approximately 5 1/16 inches; and the pan means has a maximum depth of approximately ¾ inch. This dimension balance device is but one of the many forms of balance devices that can be constructed within the scope of the invention and is presented only as an example of such.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An educational balance device for demonstrating the principle of the equal arm balance comprising a U-shaped support means having a pair of upstanding legs, a fulcrum means supported in and positioned across said upstanding legs, a yoke means supported from said fulcrum means in depending manner, an elongated flat beam of substantial width supported at the central portion thereof on said yoke means, and pan means secured to each end of said elongated flat beam.

2. An educational balance device as set forth in claim 1 wherein said yoke means is U-shaped and has a pair of legs supported on said fulcrum means.

3. An educational device as set forth in claim 2 wherein said support means is provided with an oppositely disposed vertical slot in the upper portions of each of said upstanding legs, said yoke means is provided with an oppositely disposed triangular slot in the upper portions of each of said legs thereof, and said fulcrum means passes through each of said vertical and triangular slots whereby the top edge of said fulcrum means abuts the apex of each triangular slot.

4. An educational device as set forth in claim 3 wherein said pan means are semi-cylindrical in cross-section.

5. An educational device as set forth in claim 3 wherein said beam is provided with equi-spaced calibration marks longitudinally thereof for adapting said device to additionally demonstrate the principle of the lever.

References Cited

UNITED STATES PATENTS

| | | | |
|---|---|---|---|
| 1,354,275 | 9/1920 | Bachman | 177—190 |
| 1,415,278 | 5/1922 | Tod | 35—24 |
| 3,212,202 | 10/1965 | Heinichen | 35—31 |

EUGENE R. CAPOZIO, *Primary Examiner.*

H. S. SKOGQUIST, *Assistant Examiner.*